United States Patent [19]
Schwab

[11] 3,963,309
[45] June 15, 1976

[54] REFLEX LIGHT REFLECTOR SHEET AND METHOD FOR ITS MANUFACTURE

[75] Inventor: Kurt Schwab, Innsbruck, Austria

[73] Assignee: D. Swarovski & Co., Glasschleiferei, Wattens, Austria

[22] Filed: Dec. 13, 1973

[21] Appl. No.: 424,601

[30] Foreign Application Priority Data
Dec. 15, 1972  Austria .............................. 10745/72

[52] U.S. Cl. ................................ 350/104; 350/167
[51] Int. Cl.² .......................................... G02B 5/12
[58] Field of Search ............................ 350/97–109, 350/167; 404/9–16

[56] References Cited
UNITED STATES PATENTS

| | | | |
|---|---|---|---|
| 1,824,353 | 9/1931 | Jensen ................................. | 350/167 |
| 2,243,434 | 5/1941 | Menke ................................. | 350/106 |
| 2,948,191 | 8/1960 | Hodgson, Jr. et al. ............... | 350/105 |
| 3,449,158 | 6/1969 | Rowland ............................. | 350/106 |
| 3,580,659 | 5/1971 | Fukushima ......................... | 350/105 |
| 3,735,685 | 5/1973 | Plummer ............................. | 350/211 |

*Primary Examiner*—R. V. Rolinec
*Assistant Examiner*—Michael J. Tokar
*Attorney, Agent, or Firm*—Toren, McGeady and Stanger

[57] ABSTRACT

A reflex light reflector sheet is disclosed wherein both the front face and the rear face are provided with a plurality of juxtaposed convex lens surfaces, the rear face being covered by a mirror surface. In accordance with the invention a. the lens surfaces of said front face are aspherical;

b. the respective axes of the lens surfaces on said front and rear faces coincide, and c. the focal point of the lens which is defined by each lens surface on said front face for axially incident lights is located in or in the proximity of the associated lens surface on the rear face.

A method for preparing such a reflex light reflector sheet is also disclosed. A plastic sheet is treated so as to render the sheet susceptible to surface deformation. The sheet is then passed through the nip of patterning rollers which rotate synchronously in opposite direction, the patterning rollers having surface patterns which are complementary to the lens surfaces.

10 Claims, 5 Drawing Figures

REFLEX LIGHT REFLECTOR SHEET AND METHOD FOR ITS MANUFACTURE

FIELD OF INVENTION

The invention is concerned with reflex light reflector sheets as they are used in reflecting highway signs, markers, and the like. The field of invention, to which this application pertains, is generally discussed in U.S. Pats. 2,543,800 and 3,702,213.

PRIOR ART AND BACKGROUND INFORMATION

Reflex light reflector sheets (hereinafter sometimes referred to as "reflector sheets") are available on the market which have the property of directing a brilliant cone of light back towards the source of an impinging incident beam of light with relatively insignificant dispersion or diversion of about 2° – 5°. Such reflector sheets comprise customarily a single layer or stratum of highly refracting spherical glass beads which act as lenses and are usually referred to as high index reflex beads. These beads are either covered with a protecting layer or lacquer or the like or remain uncovered, thus to be exposed directly to the ambient atmosphere and the light. If the beads are uncovered, the reflector sheets are usually referred to as regular reflector sheets while the covered or protected bead structures are generally termed flat top reflector sheets.

Regular reflector sheets are produced with high index reflex beads of an index of refraction of about 1.9. The rear hemispheres of the beads are either coated with a mirror layer or they are mounted in a cushion layer which contains metallic flake pigment.

For the production of flat top reflector sheets, high index reflex beads of an index of refraction of > 2.1 are used, the index of refraction normally being about 2.3. If it would be feasible, from a practical point of view, to produce high index reflex beads of an index of refraction of 2.9, the mirror layer of flat top reflector sheets could be directly applied to the rear hemispheres of the beads, as is done in respect of regular reflector sheets. However, since with the present state of art, it is not possible to produce beads of such a high index of refraction, optical considerations require the provision of a spaced layer of predetermined thickness which is placed concentrically around the rear hemispheres of the beads, the mirror layer then being applied onto the rear face of the spacer layer (see U.S. Pat. 3,702,213). The production of such reflector sheets is extremely difficult and also, due to the multilayer construction of the sheets, very expensive. The reflection values, which are obtained with prior art reflector sheets, are far below those which are obtained with reflector products that are constructed according to the triple prism system. Further, cat's-eye reflectors of glass exceed the reflection values of prior art reflector sheets.

These are, essentially, two reasons for the poor reflection values which are obtained with prior art reflector sheets. The first reason resides in the incomplete covering of the respective area with beads, which is due to the fact that the beads are applied to the substrate either electrostatically or by mere pouring. The other reason is the spherical aberration inherent in the optics of spheres, which leads to an undesired dispersion or scattering. In respect of flat-top reflector sheets, an additional factor to be considered is the variation of the distance between beads and mirror layer, as well as the variations in the diameter of the high index reflex beads employed.

Additional difficulties are encountered in the production of colored reflector sheets. Thus, for example, it is known that regular reflector sheets, which have a rear mirror layer, cannot be produced in colored form at all. As regards flat-top reflector sheets, it is difficult to obtain a color impression or appearance which is the same during nighttime and daytime light conditions.

SUMMARY OF THE INVENTION

It is a principal object of the present invention to overcome the disadvantages of the prior art reflector sheets and to provide reflector sheets of superior reflection characteristics.

It is another object of the present invention to provide reflector sheets of the indicated kind which can be produced at significantly reduced cost.

Still another object of the invention is to provide apparatus for producing the improved reflector sheets in a simple and inexpensive manner.

Briefly, and in accordance with one aspect of the invention, a reflector sheet is provided which has a front face and a rear face, both the front face and the rear face being provided with a plurality of juxtaposed convex lens surfaces, the lens surfaces of the rear face being covered by a mirror surface. In accordance with the invention, the axes of the associated front and rear lens surfaces coincide and the focal point of the lens which is defined by each lens surface on the front face is located in or in the proximity of the associated lens surface on the rear face. In accordance with the invention, it is particularly advantageous if the lens surfaces on the front face are aspherical and preferably are ellipsoid surfaces. The lens surfaces on the rear face may be Fresnel lens surfaces.

Further features of the invention concerning the structural details and configuration of the inventive reflector sheets, as well as advantageous production methods will appear from the following description.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

Figure 1:
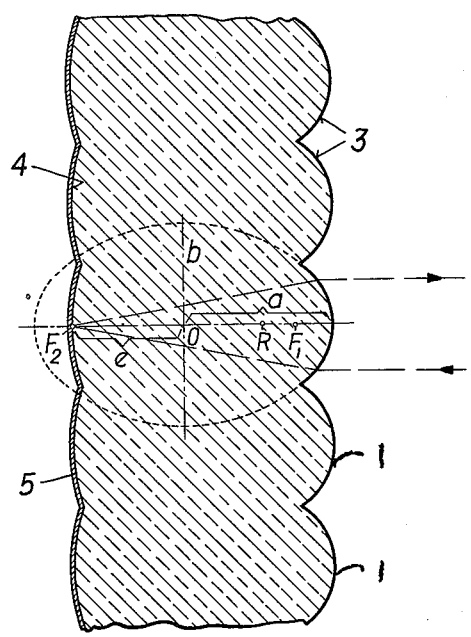
FIG. 1 shows, on greatly enlarged scale, a section through an inventive reflector sheet.

Turning first to FIG. 1, the light entry surface of the reflector sheet comprises a plurality of juxtaposed lens surfaces 1. In the embodiment here shown, these lens surfaces are portions of an ellipsoid whose larger axis a extends perpendicular to the areal extension of the sheet. The eccentricity $e$ of the ellipse is determined by the smaller axis $b$. As seen in FIG. 1, the two focal points $F_1$ and $F_2$ are spaced at this distance from the center point O. If the ratio $(a/e) = n$, the light rays which impinge parallel to the axis a collect or concentrate in the focal point $F_2$. If a mirror is provided at this location, the light rays are reflected at the mirror and are thrown back and leave the reflector sheet in the direction of the optical axis which coincides with the direction of the larger main axis $a$ of the ellipsoid.

It will be appreciated that such a system causes impinging incident light to be thrown back into the direction of source almost without scattering or dispersion. With standard measuring methods, with 5.0° viewing angle and ⅓° scattering or dispersion angle, a reflection gain of more than 200% is obtained. With a large viewing angle - for example, 30° - the light values, percentagewise, decrease more than with bead lenses. However, considered from an absolute point of view, they are still superior to the corresponding values of spherical reflectors.

With a view to obtaining optimum reflection with larger viewing angles, the rear sides or faces of the lens elements are constructed in spherical manner, the radius of these rear lens surfaces corresponding essentially to he distance of the centerpoint R of the apex of the circle of curvature of the front lens surface 1 to the focal point $F_2$. The most favorable value for the radius of the rear spherical lens surfaces was determined by means of practical experiments and is, in fact, somewhat smaller than this distance $R - F_2$.

In order to keep light losses as low as possible, it is recommended that the front and rear lens surfaces should be contiguous. The division T with which the individual elements are arranged is dependent on the selected thickness D of the sheet and the index of refraction of the material from which the sheet including the lens surface is made. Preferably the relation $$D = a + e$$

$$b \leq T \leq 1.7\ b \text{ applies.}$$

It will thus be appreciated that the inventive reflector sheet does not make use of beads but is advantageously formed from a plastic sheet which is shaped and provided with the lens surfaces to comply with the above-indicated conditions.

In this context, it should be noted that reflector sheets which do not make use of glass beads have previously been suggested. These reflector sheets, however, are based on the principle of the triple mirror or reflector.

The difficulty with the triple mirror or triplet reflector system is that in spite of the smallness of the triplet, absolute planeness of the surfaces is required because it is a mirror system. Such absolute planeness, however, can only be accomplished by way of injecting molding manufacturing procedures requiring considerable molding times of up to 20 hours. It is not possible to obtain satisfactory planeness by thermo-forming plastic material. Even small deviations in the planeness or small erros in the angular relationship of the triple mirror surfaces cause significant scattering or dispersion of the reflected light, since any error is doubled in a mirror construction. Thus, such errors cause an impermissible decrease in the reflection.

By contrast, in accordance with the present invention, a plastic sheet is subjected to thermoforming or forming by ultrasonic radiation and the desired exactness can be obtained without difficulties, since the optically active parts are lenses and not plane mirrors.

Considered from another aspect, the invention is also directed to a method for preparing the improved reflector sheets. Thus, the reflector sheets can be produced as follows. A prefabricated thermoplast sheet which thus can be thermoplastically deformed and which has a predetermined thickness, is first brought into the desired state or condition in which it can be thermoformed. This may be accomplished by introducing the thermoplastic sheet into a zone or space which is heated by infra-red radiation. Further, hot air may be used for this purpose. Once the sheet has been brought into the thermoformable condition, it is passed through the nip formed between two patterning rollers which impart the front and rear faces of the sheet with the desired lens surface pattern.

One of the patterning rollers has a surface pattern which is complementary to the lens surface pattern to be impressed or embossed on the front face of the sheet (to wit, aspherical lens surfaces) while the other patterning roller has a surface pattern complementarily corresponding to the structure of the spherical lens surfaces to be impressed onto the rear face of the sheet.

The patterning rollers are arranged at a defined distance from each other so as to leave open a nip of predetermined width dependent on the width and nature of the sheet. The rollers rotate synchronously in opposite direction in such a manner that the optical axes of the lens surfaces to be impressed on the front and rear faces of the sheet coincide. The sheet is then cooled immediately after the thermoforming. The cooling may be effected by either cooling the rollers proper, or by cold air or a cooling liquid, or both.

The rear face of the sheet, which thus corresponds to the exposed rear lens surface, is thereafter imparted with a mirror layer in any manner known per se as, for example, by vacuum deposition of metal. A protecting layer may then be applied by cementing or the like. Thus, an adhesive paper layer may be applied to the exposed mirror surface.

Instead of heating the sheet by infra-red radiation of hot air, prior to passing the sheet through the nip of the patterning rollers, the sheet may be rendered deformable by subjecting it to ultrasonic waves. This may be accomplished while the sheet passes through the nip between the rollers and, for this purpose, it is then advantageous that one of the patterning rollers is vibrated or oscillated, the oscillations extending perpendicular to he surface of the sheet passing through the nip and the frequency of the oscillations being within the ultrasonic range. The conversion of the sheet into the deformable condition is thus accomplished within the roller nip.

According to another embodiment of the inventive procedure for producing the inventive reflector sheets, each sheet comprises a laminated structure of two sheet segments, one of which carries the lens surfaces of the front face, while the other one carries the lens surfaces of the rear face. As is known, customarily used thermoplastic sheets with smooth surfaces are generally produced by casting or extruding a plastic mass through a slot or nozzle. Surprisingly, the thickness of plastic sheets produced in this manner is quite uniform and constant. These characteristics of customarily produced plastic sheets are utilized for this second embodiment of the inventive procedure. Thus, a plastic mass is cast or extruded through the nozzle or slot in conventional manner and the mass exiting from the slot or nozzle is directed onto a support bed which carries a surface pattern which is complementary to the lens surface pattern to be ultimately obtained on the front face of the reflector sheet. The mass, upon solidification, thus forms a sheet having a smooth surface and an opposite surface imparted with the lens surface pattern for the front face. The procedure is then repeated with a second batch of plastic mass which is directed onto a support bed or structure carrying a surface pattern which is complementary to the lens surface pattern to be applied to the rear face of the reflector sheet. The two sheets thus obtained are then cemented together with their unpatterned smooth faces facing each other, whereby an integral laminated reflector sheet structure is obtained which carries the desired lens surface pattern on its front and rear faces. In practice, the support structures onto which the plastic mass emanating from the slot or nozzle is directed are moved relative to the slot or nozzle and may, for example, be in the form of rotating drums of large diameter. It will be appreciated that, in proceeding in this manner, care has to be taken that the optical axes of the lens surfaces on one of the sheet segments coincide with those of the associated lens surfaces on the other sheet when the two sheet segments are united.

In producing such sheet segments or partial sheets which are subsequently united into a single sheet structure, the casting or extrusion slot or nozzle may discharge onto a plane support structure or, as already mentioned, the support structure may be in the form of a drum whose patterned circumferential surface is rotated below the slot or nozzle. If the drum diameter is sufficiently large, a satisfactory plane rear surface is obtained. These partial sheets can be readily removed from the drum and can then be cemented together with the partial sheet carrying the other lens surface pattern. The cooling of the plastic mass after it has been applied to the patterned support structures may be effected in any conventional manner. Generally, it is recommended to cool the support structures proper. Additionally, or in the alternative, a cooling agent may be used that is sprayed or blown onto the support structures with the sheets thereon. The cooling agent may thus be in gaseous or liquid form.

The inventive procedure is also suitable for the production of colored reflector sheets. For this purpose, and in its simplest aspect, this modification of the invention provides for the use of previously colored smooth surface thermoplastic sheets. If the ultimate reflector sheet is produced in accordance with the second alternative as discussed above, to wit, by casting a plastic mass into partial sheets, the plastic mass is then to be dyed or colored prior to the casting. It should be noted in this context that color pigments are to be preferred over soluble dyestuffs, since the former results in greater light fastness. However, it is also feasible to prepare colored reflector sheets from colorless plastic sheets or plastic masses by subsequently coating the lens surfaces on the front face of the ultimate reflector sheets with a thin colored laquer. The same applies to the lens surfaces on the rear face. In this case, the mirror layer is applied after the colored lacquer has been placed on the exposed surface of the lens surfaces so that the mirror layer is separated from the rear lens surfaces by the interposed colored layer.

The optical elements, to wit, the lens surfaces, are preferably arranged in juxtaposed manner and in rows. For this purpose, a square division of the sheet surface provides the most favorable solution. If the lens surface rows are offset relative to each other, then a hexagonal boundary line for the lens surfaces is particularly suitable. If a small reduction of the reflection effect is not of great consequence, intermediate surfaces between the optical lens surfaces may be interposed. This is to be recommended if the production procedure is to be rendered less expensive.

The invention also proposes a suitable and exceedingly economical manner of producing the surface patterns on the patterning rollers or the support structures such as the support beds or drums carrying the surface patterns, as explained in the second alternative discussed above. This proposal makes use of glavanic production of the surface patterns as follows: A small master tool is first produced which has a surface pattern corresponding to but a few of the lens surface configurations. This surface pattern on the master tool may be obtained by suitable erosion treatment or the like. By means of this master tool, any desired number of casts or blanks are then prepared from plastic sheets and all the casts are combined to a large plate which thus has a surface pattern corresponding to the desired lens surface pattern. This plate is then provided with a conducting layer and the plate is subsequently electroplated to produce electroplates which thereupon in known manner are mounted on the rollers, drums, or beds to form the desired surface patterns which thus are complementary to he patterns to be impressed into the reflector sheets. However, it is, of course, also feasible to impart the entire surface of a roller or a casting bed with the required surface pattern by erosion or the like.

The inventive reflector sheets are more weather resistant than prior art sheets. The reason for this is that the inventive sheets comprise but three layers, to wit, the sheet proper, the mirror surface and the adhesive protecting layer. If the sheets are prepared from partial sheets as described above, then the ultimate reflector sheet structure will have four layers. By contrast, the prior art reflector sheets comprise 7 to 9 layers and thus are more susceptible to weather influences.

Figure 2:
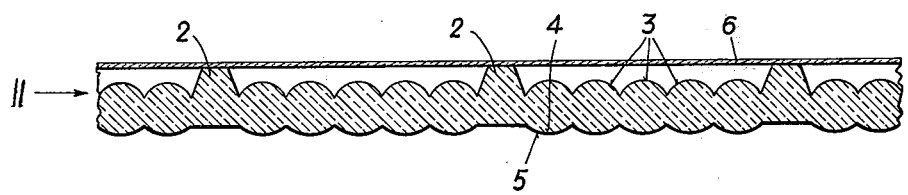
FIG. 2 is another section through a reflector sheet of a different embodiment.
Figure 3:
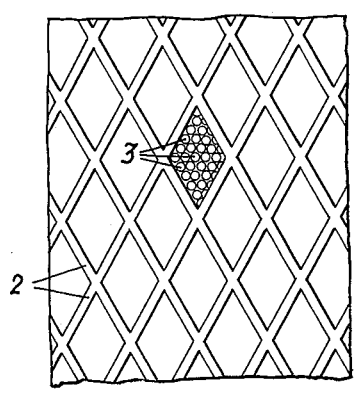
FIGS. 3 and 4 are plan views of inventive reflector sheets.
Figure 4:
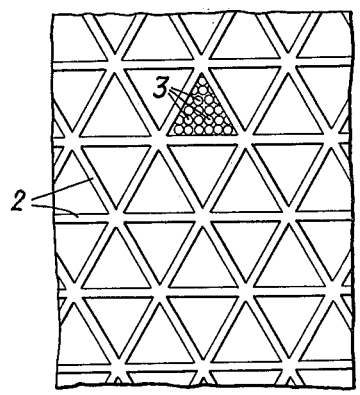

Turning now to FIG. 2, the reflector sheet shown therein and generally indicated by reference numeral 11 is provided on its front face with web-like projections 2 which extend in net-like manner, as clearly seen in FIGS. 3 and 4. The lens surfaces 3 of the front face of the reflector sheets 11 are situated between this net structure 2 but on a lower level, as indicated in FIG. 2. A second sheet 6 covers the lens surfaces 3 and is secured to the reflector sheet by the net-like web structure 2, for example, by cementing or fusing. It should be noted that the web 2 projects above the lens surfaces 3 so that the cover sheet 6 extends above the lens surfaces. The reason for this construction is that for optical considerations, air should be present between the cover sheet 6 and the lens surfaces 3. The rear face of the reflector sheet 11 carries the lens surface 4 which are coated with a mirror layer 5. The reflection characeristics of the sheet FIG. 2 are those of a flat-top reflector sheet.

Instead of using webs of the nature indicated in FIG. 3, short projections may be formed instead, which are situated at the crossing points of the net structure. The webs may form any number of geometrical configurations. They may thus be diamond-shaped, triangular, square, hexagonal, and the like.

The lens surfaces 3 as shown in FIGS. 3 and 4 are indicated in the form of small circles. Since, however, these surfaces are contiguous, they have a polygonal plan view. For reasons of clearer presentation on the drawings, the width of th web and the diameter of the lens surfaces 3 in FIGS. 3 and 4 have been shown in exaggerated size relative to the length of the web.

Figure 5:
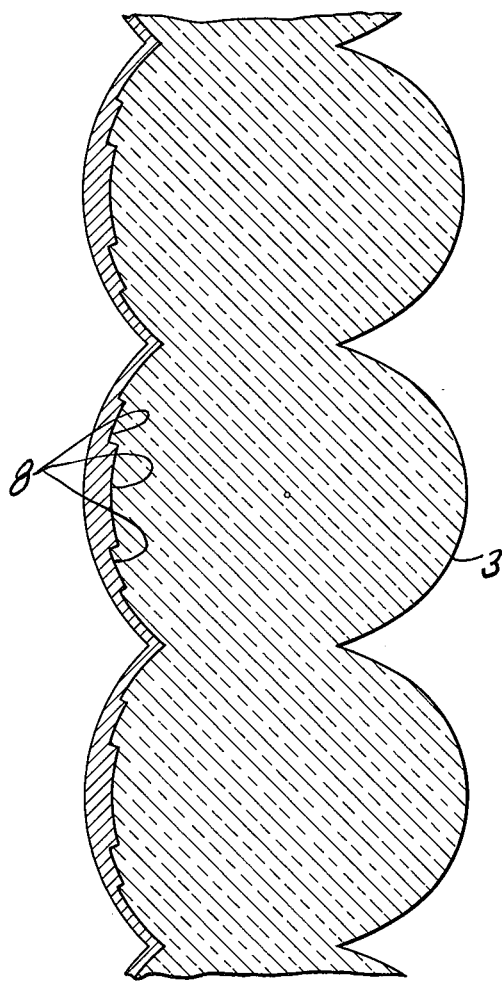
FIG. 5 illustrates in sectional view a reflector sheet of the present invention employing Fresnel lenses.

FIG. 5 illustrates the reflective structure wherein the rear reflective surface is in the shape of Fresnel lens element 8.

What is claimed is:

1. In a reflex light reflector sheet having a front face and a rear face, wherein both said front face and said rear face are provided with a plurality of juxtaposed convex lens surfaces, said rear face being covered by a mirror surface, the improvement which comprises that:
   a. the lens surface of said front face are aspherical, said surface being defined geometrically by the rotation of a meridian section deviating from a circle about an axis;
   b. the lens surfaces of the rear face are Fresnel lens surfaces,
   c. the respective axes of the lens surfaces on said front and rear faces coincide, and
   d. the focal point of the lens which is defined by each lens surface on said front face for axially incident light is located in or in the proximity of the associated lens surface on the rear face.

2. A reflex light reflector sheet as claimed in claim 1, wherein the lens surfaces on said front face are portions of ellipsoid surfaces.

3. A reflex light reflector sheet as claimed in claim 1, wherein said lens surfaces on said front and rear faces are contiguous so that optically ineffective surfaces are avoided.

4. A reflex light reflector sheet as claimed in claim 1, further comprising a plurality of spaced apart web members projecting from said front face and beyond the level of the lens surfaces on the front face, and a cover layer extending above said front face and connected to said reflector sheet by said web members.

5. A reflex light reflector sheet as claimed in claim 4, wherein said web members form a net-like pattern.

6. A reflex light reflector sheet as claimed in claim 1, wherein said sheet including the lens surfaces is made of plastic material.

7. A reflex light reflector sheet as claimed in claim 1, wherein said sheet comprises a first sheet layer carrying said front face and the lens surfaces of said front face and a second sheet layer carrying said rear face and the lens surfaces on said rear face, said first and second sheet layers being adhesively united with the lens surfaces on said front and rear faces facing away from each other.

8. A reflex light reflector sheet as claimed in claim 6, wherein said plastic material is colored by means of pigments.

9. A reflex light reflector sheet as claimed in claim 1, wherein the lens surfaces of at least one of said front and rear faces are coated with a colored layer.

10. A reflex light reflector sheet as claimed in claim 9, wherein said layer is a lacquer layer containing pigments.

* * * * *